US009768896B2

(12) United States Patent
Rotsaert (10) Patent No.: US 9,768,896 B2
(45) Date of Patent: Sep. 19, 2017

(54) METHOD OF SELF-ADAPTATION OF A SIGNAL QUALITY, CORRESPONDING DEVICES AND COMPUTER PROGRAM

(71) Applicant: INGENICO GROUP, Paris (FR)

(72) Inventor: Christopher Rotsaert, Wasquehal (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 14/893,414

(22) PCT Filed: May 19, 2014

(86) PCT No.: PCT/EP2014/060253
§ 371 (c)(1),
(2) Date: Nov. 23, 2015

(87) PCT Pub. No.: WO2014/187781
PCT Pub. Date: Nov. 27, 2014

(65) Prior Publication Data
US 2016/0099785 A1  Apr. 7, 2016

(30) Foreign Application Priority Data

May 21, 2013  (FR) ...................................... 13 54537

(51) Int. Cl.
*H04B 17/00* (2015.01)
*H04B 17/382* (2015.01)
(Continued)

(52) U.S. Cl.
CPC ....... *H04B 17/382* (2015.01); *H04B 17/0085* (2013.01); *H04B 17/309* (2015.01); *H04M 1/72527* (2013.01)

(58) Field of Classification Search
CPC ............... H04B 17/382; H04B 17/309; H04M 1/72527; H04M 2250/14; G06Q 20/32; G07F 7/0886
See application file for complete search history.

(56) References Cited

U.S. PATENT DOCUMENTS 8,931,699 B1 * 1/2015 Wade ..................... G06K 7/084
235/435
2004/0242257 A1 * 12/2004 Valkealahti ........... H04W 16/06
455/522
(Continued)

FOREIGN PATENT DOCUMENTS

EP          1874014 A2    1/2008
KR        101178246 B1    9/2012
WO       2013027989 A2    2/2013

OTHER PUBLICATIONS

English translation of the International Search Report dated Jun. 20, 2014 for corresponding International Patent Application No. PCT/EP2014/060253 filed May 19, 2014.
(Continued)

*Primary Examiner* — Aristocratis Fotakis
(74) *Attorney, Agent, or Firm* — David D. Brush; Westman, Champlin & Koehler, P.A.

(57) ABSTRACT

A method self-adapts signal quality of non-audio data exchanged via an audio channel between a mobile terminal and a payment accessory. The method includes at least one iteration of the following acts: reception, by the mobile terminal, of a reference signal transmitted by the payment accessory; analysis, in the mobile terminal, of the received reference signal, the analysis delivering at least one item of information representative of the quality of the reference signal, referred to as quality information; transmission, by the mobile terminal to the payment accessory, of the quality information. In the above iteration, the roles of the mobile terminal and the payment accessory can be switched.

19 Claims, 5 Drawing Sheets (51) Int. Cl.
H04M 1/725 (2006.01)
H04B 17/309 (2015.01)

(56) References Cited

U.S. PATENT DOCUMENTS

| | | | | |
|---|---|---|---|---|
| 2005/0018784 A1* | 1/2005 | Kurobe | ............... | H04L 1/0003 375/260 |
| 2006/0140290 A1* | 6/2006 | Li | ........................ | H04B 7/04 375/260 |
| 2010/0314446 A1* | 12/2010 | Morley, Jr. | ............ | G06K 7/083 235/449 |
| 2012/0052910 A1* | 3/2012 | Mu | ................... | H04M 1/72527 455/558 |
| 2012/0084210 A1* | 4/2012 | Farahmand | ........ | G06Q 20/3226 705/64 |
| 2012/0095914 A1 | 4/2012 | McKelvey et al. | | |
| 2012/0320714 A1 | 12/2012 | Lin et al. | | |
| 2013/0095754 A1* | 4/2013 | Moreton | ............ | G06Q 20/3226 455/41.1 |
| 2014/0074698 A1* | 3/2014 | Poole | ................ | G06Q 20/3226 705/39 |
| 2015/0349896 A1* | 12/2015 | Post | .................... | H04B 15/005 235/380 |

OTHER PUBLICATIONS

English translation of the Written Opinion dated Nov. 21, 2015 for corresponding International Patent Application No. PCT/EP2014/060253 filed May 19, 2014.

* cited by examiner

METHOD OF SELF-ADAPTATION OF A SIGNAL QUALITY, CORRESPONDING DEVICES AND COMPUTER PROGRAM

1. CROSS-REFERENCE TO RELATED APPLICATION

This application is a Section 371 National Stage application of International Application No. PCT/EP2014/060253, filed May 19, 2014, the content of which is incorporated herein by reference in its entirety, and published as WO 2014/187781 on Nov. 27, 2014, not in English.

2. FIELD OF THE INVENTION

The field of the invention is that of electronic payment devices and more particularly portable or mobile payment terminals which can be associated with payment accessories such as detachable data acquisition peripherals (or roam data readers), provided for example with means for reading an electronic card such as a contact or contactless magnetic card, and especially an electronic payment card. A simple connection of such a peripheral to a telephone provided with Internet communications functions, for example through a telephone audio connector, makes it possible then to have a terminal capable of making payments. For example, the pieces of data read on a magnetic card can be transmitted by the peripheral which can then process them or transmit them to an online payment application.

More particularly, the invention pertains to the quality of the audio signal exchanged between the electronic terminal and the payment accessory.

3. PRIOR ART

At present, an audio circuit is therefore used to exchange data between the electronic terminal and the payment accessory and more broadly between two electronic devices. This audio circuit is not covered by a standard and it is sometimes difficult to obtain signal exchanges of sufficient quality to enable the use of the data carried by the audio signal. Indeed, since the use of this audio circuit is diverted to transmit data and not a vocal or musical audio signal, it can happen that transmission parameters deemed to be the optimal parameters for audio are not suited to the transmission of data other than audio data.

For example, certain electronic devices such as smartphones require a minimum signal amplitude for the transmission of a vocal or musical audio signal whereas others require a more limited amplitude in order to avoid the distortion of the signal. Now, at present, a payment accessory connected to a smartphone cannot be adapted to each type of smartphone with which it can be connected.

In addition, another consequence of these disparities of operation of the different electronic devices is that it is not possible to define a quality of the standard signal such as for example a standard amplitude which is supported by all the electronic devices.

Besides, as already stated, it can happen that a standard signal quality defined for voice or music is not optimal for data in a payment application as described here above.

In order to try and overcome these drawbacks, a technique currently used in certain payment accessories consists in defining two amplitude parameter values and choosing one of them according to a parameter transmitted by the smartphone. On the smartphone side therefore, a parameter is defined according to a predetermined list of smartphones. From the smartphone to which it is connected, the payment accessory receives the parameter enabling it to define the value to be used for subsequent transmissions with this smartphone. The major drawback of this solution lies in the predetermined list which does not allow for the possibility of supporting a novel model of electronic device (i.e. a model not yet defined in the list). This therefore calls for regular updates of the predetermined list and preliminary tests and the following up of the novel electronic devices. Even when this list is updated regularly, there remains a risk of a manufacturer modifying his electronic device while keeping the same reference so that certain electronic devices, typically smartphones, that have a same reference do not have the same characteristics and are not compatible with pre-defined values predefined by the payment accessories.

There is therefore a need for a solution that takes account of these prior-art drawbacks in order to optimize the quality of the signal exchanged via an audio channel between two electronic devices.

4. SUMMARY OF THE INVENTION

The invention pertains to a method of self-adaptation of a quality of non-audio data signal exchanged between a first electronic device and a second electronic device via an audio channel.

For example, the second electronic device is a mobile terminal and the first electronic device is an electronic payment accessory connected to the mobile terminal via the audio connector of the mobile terminal.

Thus, according to this particular embodiment of the invention, the method of self-adaptation can be applied to exchanges of non-audio signals between a payment accessory (having for example contactless card reading means or magnetic card reading means) and a mobile terminal (for example a smartphone having electronic payment functions) via the audio jack of the mobile terminal. For example, the payment accessory is connected to the mobile terminal via the audio connector of the mobile terminal and the signal transmitted from the payment accessory to the mobile terminal corresponds to the data read on a bank card, this data having to be processed by the mobile terminal to validate a transaction for example.

According to another example, the first electronic device is a mobile terminal and the second electronic device is an electronic payment accessory connected to the mobile terminal via the audio connector of this mobile terminal.

Thus, according to this embodiment of the invention, the quality of the signal transmitted by a mobile terminal to a payment accessory, connected to the mobile terminal via the audio jack of this mobile terminal, has to be optimized.

Naturally, the two particular embodiments described here below are compatible and the method of self-adaptation is used to determine transmission parameters of a signal transmitted from the first device to the second device as well as a signal transmitted from the second device to the first device.

According to the invention, the method comprises a step for the sending, by the first electronic device, of a first reference signal to the second electronic device, and at least one iteration of the following steps:

if, before the expiry of a predetermined duration, the first electronic device receives a response coming from the second electronic device:

modification, by the first electronic device, of the first reference signal in taking account of at least one piece of quality information present in the response coming from the second electronic device, delivering a first modified reference signal;

sending, by the first electronic device, of the first modified reference signal to the second electronic device;

when there is no response coming from the second electronic device at the expiry of the predetermined duration, sending by the first electronic device of a second reference signal, distinct from the first reference signal, to the second electronic device.

Thus, the invention relies on a wholly novel and inventive approach to the adjustment of the quality of a non-audio data signal exchanged between two electronic devices, via an audio channel (for example an audio connector on the devices) in enabling an iterative self-adaptation of the quality of the reference signal.

Indeed, since the audio channel used for the exchange of non-audio data between the two devices is suited to the exchange not of non-audio data but of audio signals, then, depending on the transmission parameters, the non-audio data signal can be degraded by the audio channel in such a way that the data is no longer exploitable. Now, this signal exchanged by the audio channel can correspond to data read by a first electronic device (for example a payment accessory having available a card reader) and transmitted by this first device to a second device (for example a mobile terminal) that has to interpret and then process this data, for example to validate a bank transaction. These pieces of data must therefore be received with optimum quality to be capable of being exploited.

In addition, not only can the audio channel degrade the signal but the respective sending and receiving characteristics of the two electronic devices must also be considered for the quality of the received signal. Indeed, the entire audio circuit comprising the sending characteristics of the first device, the transmission channel for transmission via the audio connectors and the reception characteristics of the second device can degrade the signal.

Thus the invention, according to its different embodiments, implements an iterative method based on an analysis, in the receiver device, of a reference signal sent by the other device so as to determine the quality of the received signal, for example by determining whether the extracted data can be exploited and adjusting the transmission parameters of the reference signal to optimize its quality.

Thus, according to this embodiment of the invention, the piece of quality information sent by the second device enables a first device to modify the reference signal for another iteration of self-adaptation.

As a consequence, the method enables the self-adaptation of the quality of the signal exchanged between two electronic devices without prior knowledge of technical characteristics of these devices or of the audio channel enabling the exchange of data and without user action.

Indeed, the iterative method is entirely automatic and can be based on one or more exchanges of reference signals used to ultimately determine transmission parameters of the signal used to obtain optimal quality of exploitation of the data received via this signal.

For example, the first iteration can consist, first of all, in identifying a reference signal interpretable by the second device and, once the signal is found, in refining certain of these transmission parameters in such a way as to be able to implement an optimal communication between the two devices.

Thus, it can happen that the first reference signal transmitted by the first device is not received or interpreted by the second device which therefore does not respond to the first device following this sending of the reference signal. This is why a timer is implemented in the first device which sends another reference signal if it has not received any response from the second device upon expiry of the timer. In this case, the second reference signal has transmission parameters different from the first one so as to "test" another type of signal. A maximum number of attempts can be predefined so as to stop the process of self-adaptation if the second device responds to none of the previous attempts.

By contrast, when the second device responds to the first device following the transmission of the first reference signal, the second device takes account of this response and especially of a piece of quality information present in the response to modify one or more transmission parameters of the first reference signal and thus send back a modified first reference signal to the second device in order to optimize communication between the two devices.

According to one particular parameter of the invention, the method comprises at least one iteration of the following steps:

the reception, by the second electronic device, of a reference signal sent by the first electronic device according to the method described here above;

analysis, in the second electronic device, of the received reference signal, the analysis delivering at least one piece of information representing the quality of the reference signal denoted as quality information;

the sending, by the second electronic device to the first electronic device, of the piece of quality information.

Thus, the invention according to its different embodiments implements an iterative method based on an analysis, in the reception device, of a reference signal sent by the other device so as to determine the quality of the signal received, for example by determining whether the pieces of extracted data can be exploited and adjusting the transmission parameters of the reference signal to optimize this quality.

In particular, the step of analysis takes account of at least one predetermined criterion representing a desired quality.

Thus, according to this embodiment of the invention, the analysis of the reference signal received takes account of a predetermined criterion of reference quality such that, when this criterion is attained, the received signal is considered to be of optimal quality.

For example, this predetermined criterion is a parameter proper to the receiver device such as a rate of maximum permitted distortion, a maximum permitted bit rate, a minimum required amplitude, etc.

For example, the predetermined criterion corresponds to a maximum distortion threshold.

For example, the predetermined criterion corresponds to a maximum distortion threshold beyond which the data extracted from the received signal cannot be exploited by the receiver device.

According to one particular aspect, the step of analysis comprises the following sub-steps:

processing the reference signal delivering at least one quality parameter of the reference signal;

comparing the quality parameter with the predetermined criterion, delivering the piece of quality information.

Thus, according to this embodiment of the invention, the step for analyzing the received reference signal consists firstly of a treatment of the received signal, for example a computation of the rate of distortion of the signal delivering a parameter such as the rate of distortion of the received signal and then a comparison of this computed parameter with a maximum authorized distortion threshold.

This comparison then makes it possible to determine which transmission parameters of the reference signal are to be modified or can be modified to optimize the quality of the received signal.

For example, the piece of quality information belongs to the group comprising at least:
- a piece of information on reduction or increase of amplitude of the reference signal;
- a piece of information on modification of the frequency of the reference signal;
- a piece of information on modification of the shape of the reference signal;
- a piece of information on modification of the rate of the reference signal;
- a piece of information on validation of the reference signal;
- a piece of information combining at least two of the above-mentioned pieces of information.

Thus, for example, an excessively high distortion of the reference signal can be corrected by reducing the amplitude of the reference signal and/or modifying the frequency of this reference signal and/or modifying the shape of the reference signal (sinusoidal, etc.) and/or modifying the (bit) rate of the reference signal. In this case, the information representing the quality of the signal received (quality information) sent out by the second device corresponds to an indication for modifying the reference signal for another iteration of self-adaptation.

When the quality of the reference signal received is deemed to be optimal, then the piece of quality information sent by the second device corresponds to a validation of the parameters of the second reference signal sent by the first device.

For example, the reference signal corresponds to a sinusoidal signal of a fixed frequency and fixed amplitude and the piece of quality information corresponds to the reference signal modified according to the step of analysis.

In this particular case, when the reference signal is a blank signal, the piece of quality information sent back by the second device is a modified reference signal taking account of the distortions observed on the received signal, then enabling the first device to determine transmission parameters taking account of these distortions.

According to one particular embodiment of the invention, the method comprises a step of storage in the first and/or second electronic device of at least one parameter of transmission of the data signal when the piece of quality information is a piece of information on validation of the reference signal.

Thus, according to this embodiment of the invention, when the successive iterations of the method of self-adaptation have made it possible to arrive at a reference signal having optimal quality for the reception device, the transmission parameters of this reference signal of optimal quality are memorized so as to be used subsequently for exchanges of signals between these two electronic devices.

For example, the values of amplitude and frequency of the reference signal of optimal quality are memorized in the first device, i.e. the sender device. These parameters can also be memorized in the receiver device so as to enable better subsequent self-adaptation with another sender device for example.

For example, the transmission parameters belong to the group comprising:
- a value of amplitude of a data signal;
- a value of frequency of a data signal;
- a shape of a data signal;
- a pre-processing of a data signal;
- a piece of information combining at least two of the above-mentioned values.

In particular, the storage step also memorizes a parameter of identification of the first and/or second electronic device.

Thus, according to this embodiment of the invention, the saving of the transmission parameter or parameters of the signal associates this parameter or parameters with an identifier of the receiver device and/or an identifier of the sender device.

For example, when the first device is a payment accessory connected to a mobile telephone via the audio connector of the mobile telephone, the payment accessory can memorize the transmission parameters of a signal of optimal quality associated with the mobile telephone so as to be able to re-use these parameters for all the communications with this mobile telephone. Thus, if the payment accessory is used with another mobile telephone or another electronic device, other parameters associated with this electronic device can also be memorized. In this way, the payment accessory can optimize its communications with different electronic devices in memorizing a transmission parameter coming from one or more self-adaptation phases implemented with each of these distinct electronic devices.

According to one particular aspect of the invention, the method comprises a step of transmission of at least one data signal by the first electronic device to the second electronic device, the step of transmission taking account of the parameter of transmission memorized during the memorizing step.

Thus, according to this embodiment of the invention, once the transmission parameter or parameters have been memorized, the exchanges between the first and second devices can take account of these parameters in order to optimize the processing of the data exchanged. Consequently, the signals transmitted by the first device to the second device take account of this transmission parameter or these transmission parameters and the quality of these signals is therefore optimal for an exploitation of the data exchanged.

For example, the second electronic device is a mobile terminal and the first electronic device is an electronic payment accessory connected to the mobile terminal via the audio connector of the mobile terminal.

Thus, according to this particular embodiment of the invention, the method of self-adaptation can be applied to exchanges of signals between a payment accessory (having for example contactless card reading means and means for reading a magnetic card) and a mobile terminal (for example a smartphone having electronic payment functions) via the audio connector of the mobile telephone. For example, the payment accessory is connected to the mobile telephone via the audio jack of the mobile terminal and the signal transmitted from the payment accessory to the mobile terminal corresponds to the pieces of data read on a bank card, these pieces of data having to be processed by the mobile terminal to validate a transaction for example.

According to another example, the first electronic device is a mobile terminal and the second electronic device is an electronic payment accessory connected to the mobile terminal via the audio connector of the mobile terminal.

Thus this embodiment of the invention optimizes the quality of the signal transmitted by a mobile telephone to a payment accessory, connected to the mobile terminal via the audio jack of this mobile telephone.

Naturally, the two particular embodiments described here above are compatible and the method of self-adaptation can be used to determine transmission parameters of a signal transmitted from the first device to the second device as well as a signal transmitted from the second device to the first device.

According to this example, the piece of quality information corresponds to a piece of information representing a level of charging of the payment accessory.

Thus, according to this embodiment of the invention, the method of self-adaptation enables the optimal use of the audio channel between the mobile terminal and the payment accessory to charge this payment accessory. For example, the signal transmitted from the mobile terminal to the payment accessory corresponds to a continuous signal enabling the payment accessory to be charged and the method according to the invention can be used to define the characteristics of this signal (amplitude, duration, etc.) for an optimal charging of the payment accessory.

In particular, the method in this example corresponds to a preliminary step for charging down the payment accessory.

In order to optimize the self-adaptation applied to the charging of the payment accessory, this accessory preliminarily gets charged down. Indeed, the self-adaptation makes it possible in this case to determine the characteristics of a signal used to fully recharge the payment accessory under precise conditions where it is fully charged down. In this way, an optimal charging signal is determined, making it possible to completely recharge the payment accessory while at the same time optimizing the duration of this signal as well as its amplitude. Thus, the duration of the operation for recharging of the payment accessory is reduced along with its impact on the charging of the mobile terminal itself, in sending a charging signal of optimized amplitude and duration.

The invention also pertains to an electronic device comprising means of self-adaptation of a quality of a non-audio data signal exchanged via an audio channel with a distinct electronic device, the means of self-adaptation comprising at least the following means:

means for sending a reference signal to the distinct electronic device;
means for modifying the reference signal in taking account of at least one piece of quality information present in the response coming from the distinct electronic device, delivering a modified reference signal.

Such a device is especially capable of implementing the steps of the self-adaptation method described here above and can be for example a mobile terminal or a payment accessory.

According to another embodiment, the invention pertains to an electronic device comprising means of self-adaptation of a non-audio data quality signal exchanged via an audio channel with a distinct electronic device, the means of self-adaptation comprising at least the following means:

means for receiving a reference signal sent by the distinct electronic device described here above;
means for analyzing the reference signal, the means for analyzing delivering at least one piece of information representing the quality of the reference signal, denoted as quality information;
means for sending the piece of quality information to the distinct electronic device.

Such a device is especially capable of implementing the steps of the method of self-adaptation described here above and can be for example a mobile terminal or a payment accessory.

Finally, the invention also relates to a computer program comprising program code instructions for executing the steps of the method of self-adaptation as described here above when the program is executed on a computer.

5. LIST OF FIGURES

Other features and advantages of the invention shall appear more clearly from the following description of a particular embodiment given by way of a simple, illustratory and non-exhaustive example and from the appended drawings, of which.

6. DESCRIPTION OF ONE EMBODIMENT OF THE INVENTION

6.1 General Principle

The general principle of the invention relies on an iterative process of self-adaptation of the quality of a non-audio data signal transmitted by a first device to a second device via an audio channel used to determine at least one parameter of transmission of this data signal so as to obtain an optimal quality for subsequent transmissions.

To this end, the self-adaptation is based on the transmission, by the first device to the second device, of a reference signal which is analyzed when this can be done, in a second device so as to send in return a piece of information representing the quality of the reference signal, called quality information.

According to the different embodiments of the invention, this piece of quality information enables the first device to modify the reference signal so as to improve the quality of the signal received by the second device. The steps of analysis of the reference signal and of transmission of a piece of quality information are iterated again, as is the step of modification of the reference signal until an optimal quality of the received reference signal is obtained.

The iterative process can be implemented in either one of the two devices so as to optimize transmission in either sense of communication.

The analysis of the quality of the reference signal received can consist of any processing that makes it possible to determine whether the received signal is exploitable, for example by computing the distortion rate of the received signal or by comparing its amplitude with a minimum required amplitude or a maximum tolerated amplitude.

The method of self-adaptation according to the different embodiments of the invention can be implemented systematically when connection is made between the two devices, as a sort of initializing function for initializing a peripheral on a telephone for example. Thus, all the subsequent exchanges between the two devices benefit from this self-adaptation and have an optimized signal quality.

The method of self-adaptation according to the different embodiments of the invention can also be triggered at the time of the first data transmission between the devices or when several data transmissions have failed between the devices.

Or again, the self-adaptation method according to the different embodiments of the invention can be triggered by a request from the user of the devices, for example when the application of self-adaptation downloaded in his mobile telephone proposes that he implements an iteration of self-adaptation.

In yet another case, the different steps of the method of self-adaptation can be implemented once, in order to obtain a piece of quality information on the reference signal received and to leave the user the choice, depending on this piece of quality information, of implementing or not implementing other iterations of the self-adaptation method. For example, the user can choose to try and obtain optimal quality of transmission between the two devices, by launching one or more iterations of the process of self-adaptation, or else he can choose to be contented with sufficient quality, although it is not optimal quality, for example in order to gain time.

After self-adaptation, the optimized parameters can be memorized locally in either one of the devices or centralized in a database on a server for example to make it possible to add more devices to a list of supported devices (even with self-adaptation according to one of the particular embodiments of the invention, it can happen that certain devices are not supported) and/or to provide a piece of information on restriction on performance levels (if only the low (bit) rate parameters are supported for example).

Besides, in certain cases, a first phase of the self-adaptation process is one of identifying a reference signal interpretable by the second device. Indeed, the reference signal transmitted by the first device can quite simply be not interpretable by the second device, hence considered to be not received because its parameters are not supported by this device. In this case, it can happen that the second device does not respond to the first one which must therefore send back a distinct reference signal to try and be "understood" or "heard" by the second device.

To this end, a "timer" of a predetermined duration is implemented in the first device so that it does not wait indefinitely a response from the second device. Thus, at the expiry of the timer, if the second device has not responded to the first device, then this first device reiterates its transmission with a distinct reference signal (for example of a different type) and does so for example until a predetermined maximum number of attempts.

Once a type of reference signal is received and interpreted by the second device, its parameters are so to speak "refined" in order to obtain a reference signal of optimal quality, in order to optimize subsequent communications between the two devices.

6.2 Description of One Embodiment

Figure 1:
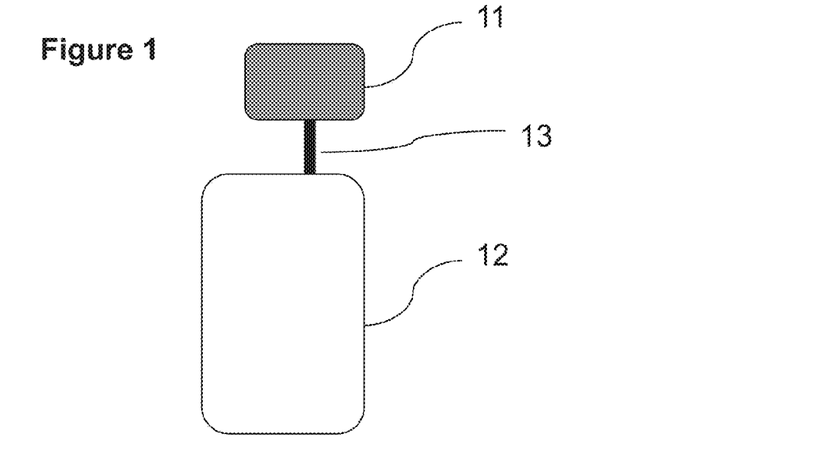
FIG. 1 illustrates an example of a system in which the method of self-adaptation can be implemented.
Figure 2A:
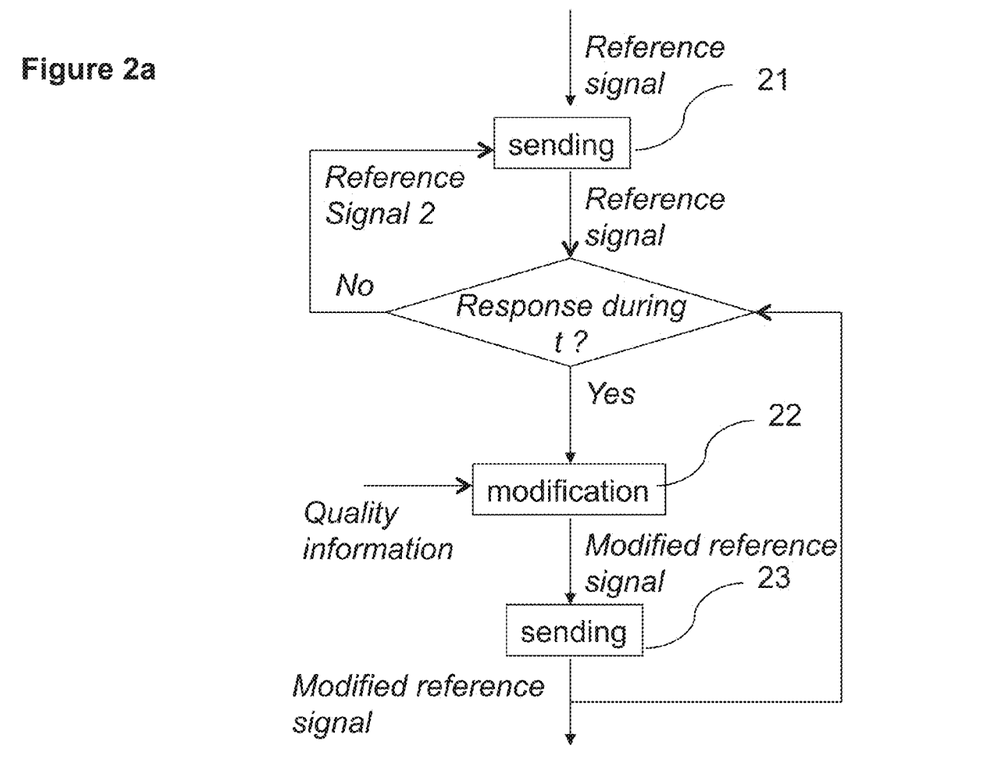
FIGS. 2a and 2b present the main steps of the method of self-adaptation according to one particular embodiment of the invention, respectively in the first device and second device involved in the self-adaptation.
Figure 2B:
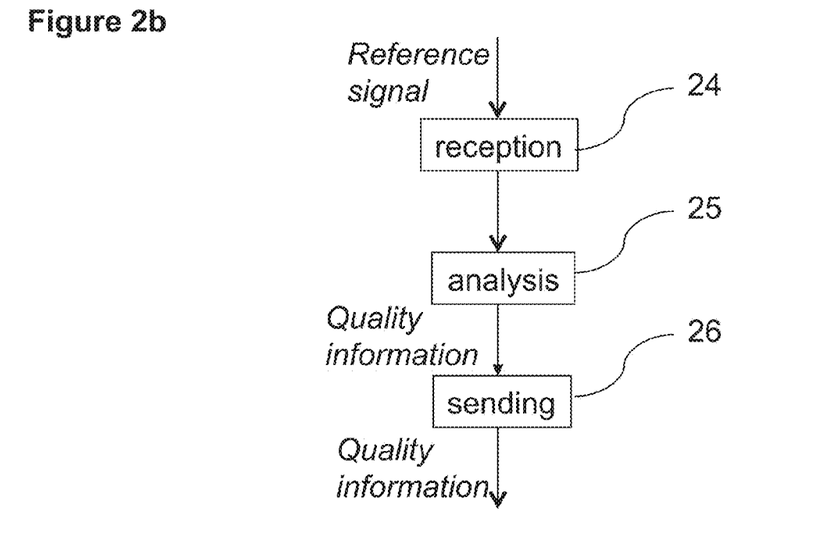

Referring now to FIGS. 2a and 2b, we present the main steps of the method of self-adaptation according to one particular embodiment of the invention implemented respectively in a first device and a second device of a system as illustrated in FIG. 1.

In this system, a first device 11 (for example a payment accessory) is connected to a second device 12 (for example a mobile terminal) via an audio connector 13, for example the audio connector of the mobile terminal.

In one particular application, the payment accessory 11 enables the reading, with or without contact, of the data of a payment card (not shown) and then the transmission via an audio channel 13, of the pieces of data read to the mobile terminal 12. This mobile terminal 12 exploits these pieces of data read, via a local or remote payment application, for example to validate a transaction.

Whatever the triggering mode for the self-adaptation method (automatic start upon connection between the two devices, or during the first exchange of data, etc. as described here above), a first step 21 for sending a reference signal, denoted as "Reference Signal", having predetermined transmission parameters, is implemented by the first device 11. A "timer" of a predetermined duration t is triggered upon the sending of this reference signal, so as to await a response from the second device only during this duration t.

Thus, if the second device 12 does not respond to the first device 11 before the expiry of the timer, for example because it has not received the reference signal, or has not been able to interpret this reference signal as being a self-adaptation signal, then the first device reiterates this sending step 21 with a reference signal distinct from the first one (denoted for example as Reference signal 2), for example of another type of family of reference signals. A new timer is triggered and the steps are reiterated until the identification of a reference signal that can be interpreted by the second device or until a predetermined maximum number of attempts is reached.

By contrast, if the second device 12 responds to the first device 11 before the expiry of the timer, the first device takes account of this response and especially of the piece of quality information present in this response (described more specifically here below) to implement a step 22 of modification of the reference signal and a step 23 for sending a modified reference signal. Here again, a timer is triggered and the steps 22 and 23 can be reiterated until a reference signal of optimal quality is determined, as described here below.

In the second device 12 (here again whatever the mode of triggering of the method of self-adaptation), a first reception step 21 is one of receiving a signal called a reference signal, denoted as reference signal presenting predetermined transmission parameters, sent by the first device 11.

Here below, we shall describe a situation where this reference signal transmitted by the first device 11 is interpretable by the second device 12.

For example, this reference signal has high amplitude, a sinusoidal shape, a classic (bit) rate, etc. or else a particular amplitude, frequency and type of format with or without pre-processing (complex signal format).

According to another example described in greater detail here below, this reference signal is a blank signal.

According to yet another example, also described here below, this reference signal is a continuous signal enabling the second device to be charged.

Once received, this reference signal is analyzed in an analysis step 25 in the second device 12 so as to evaluate its quality in order to optimize subsequent exchanges of data between these two devices 11 and 12 via the audio channel 13.

Whatever the type of analysis performed during the step 25, it is implemented according to a particular application of operation of the data received subsequently and takes account for example of one or more predetermined criteria representing a desired signal quality.

For example, the analysis 25 of the received reference signal consists in comparing its amplitude with a maximum amplitude tolerated by the device 12. Another type of analysis can consist of a computation of rates of distortion of the received reference signal, beyond which the pieces of data transmitted via this signal are no longer exploitable by the second device 12. Yet another type of analysis can consist of an evaluation of a level of jitter as compared with a given tolerance value or an evaluation relative to a specific criterion of quality or a response contained in a given template.

The result of this step of analysis 25 therefore consists, so to speak, of an evaluation of the quality of the reference signal received, in the form of a piece of quality information, denoted as "Quality information". This piece of quality information is then sent, in a sending step 26, by the second device to the first device. This piece of quality information is aimed at enabling the first device to modify, if necessary, one or more transmission parameters of the reference signal in order to transmit a modified reference signal to the second device so that this device can evaluate the quality of this modified reference signal received, during a second iteration of the steps of the self-adaptation method according to this embodiment of the invention.

For example, when the analysis 25 of the received reference signal has resulted in an observation that the quality of this received reference signal is inadequate, then the piece of quality information directly consists of an indication of modification of one or more transmission parameters. Thus, the piece of quality information can take the form of a piece of information on reduction/increase of amplitude of the reference signal and/or a piece of information on modification of frequency of the reference signal and/or a piece of information on modification of the shape of the reference signal and/or a piece of information on modification of the (bit) rate of the reference signal.

By contrast, if the analysis 25 of the received reference signal has led to an observation that the quality of this received reference signal is optimal, then the piece of quality information consists of a piece of information on validation of the reference signal. In this case, the iterations of the steps 24 to 26 come to an end and a step of memorization (not shown) of at least one transmission parameter is implemented in the first device 11. The self-adaptation of the quality of the signal exchanged between the first device and the second device is in this case terminated and has enabled a definition of at least one parameter of transmission of the signals exchanged subsequently between the first and the second devices, making it possible to obtain optimized quality of the signal received by the second device.

For example, this parameter of transmission corresponds to an amplitude and/or a (bit) rate and/or a frequency.

In addition, according to one alternative embodiment, an identifier of the second device can be associated with this transmission parameter or these transmission parameters at the time of memorization. In this way, the transmission parameters of a signal would be associated in the first device with a second particular device.

It must be noted that this step of memorization can also be implemented in the second device so that the latter also has available parameters of optimal quality of transmission of a signal via a first device. For example, these parameters could be provided subsequently to this first device during a connection of this first device to the second device, thus making it possible if necessary to remove the need for a new self-adaptation process.

According to one alternative embodiment, the reference signal is a blank signal (sinusoidal signal of a fixed frequency and amplitude), and the step of analysis 25 of this received signal comprises a first sub-step of computation of distortion in the signal received and a second sub-step of computation of a reverse function of this distortion, delivering a modified reference signal that takes account of the distortion observed. This modified reference signal, once transmitted via the audio channel and distorted by this channel, will actually be a signal that can be exploited by the second device. In this variant, the piece of quality information therefore corresponds to this modified signal which the first device can retransmit to the second device so that it verifies that the quality of the received signal is effectively optimal.

6.3 Description of Two Examples of Application

Figure 3A:
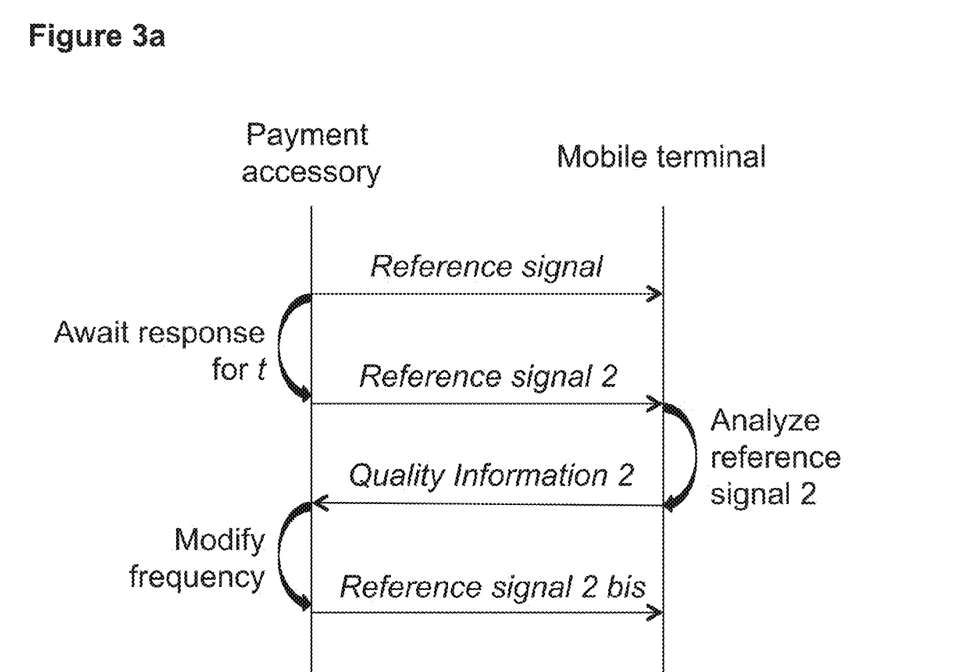
FIGS. 3a to 3c present sequence diagrams of self-adaptation according to several embodiments of the invention implemented in a system as illustrated in FIG. 1.
Figure 3B:
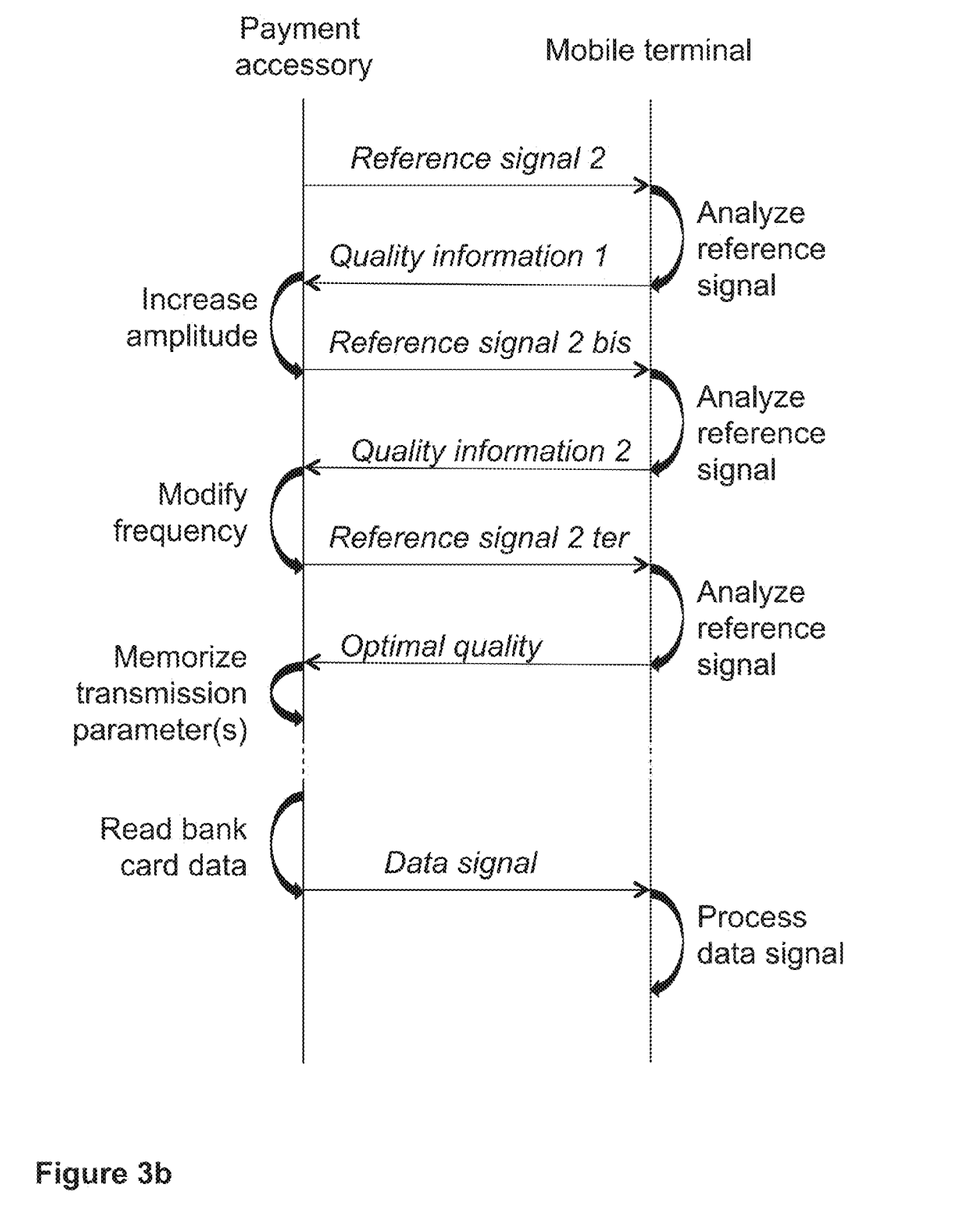
Figure 3C:
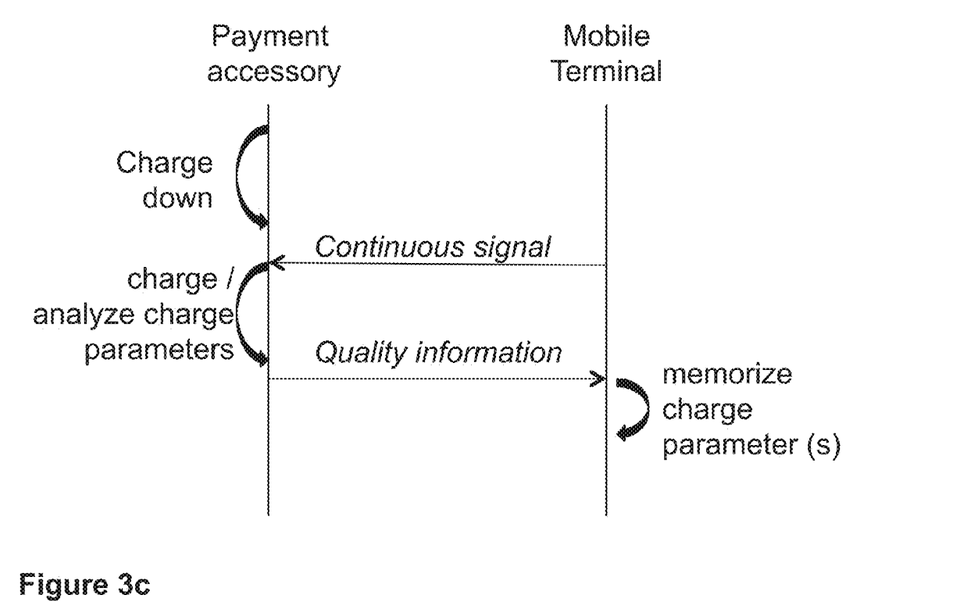

Referring now to FIGS. 3*a* to 3*c*, we present two examples of diagrams of sequences of self-adaptation, respectively according to a first figure (FIGS. 3*a* and 3*b*) and a second embodiment (FIG. 3*c*).

In the first embodiment, we consider an exchange of data between the payment accessory 11 and the mobile terminal 12 via the audio channel 13. The self-adaptation according to this embodiment of the invention consists initially in identifying a reference signal interpretable by the second device (FIG. 3*a*) and secondly in optimizing the quality of this reference signal transmitted by the payment accessory to the mobile terminal so that it can optimally exploit the transmitted data, for example data read in a bank card by the payment accessory.

As illustrated in FIG. 3*a*, the payment accessory therefore initially transmits a reference signal, denoted as Reference signal 1, to the mobile terminal. A timer t is triggered in the payment accessory so that it waits for a response from the mobile terminal only during this predetermined duration t. If the mobile terminal has not responded to the payment accessory before the expiry of the timer, this accessory sends a second reference signal, denoted as Reference signal 2, for example of a type different from Reference signal 1. This signal is considered here to be interpretable this time by the mobile terminal which can therefore implement an analysis of the Reference signal 2 and respond to the payment accessory in transmitting especially at least one piece of quality information of the signal coming from this analysis, denoted as Quality information 1 (consisting for example of a piece of information on reduction of amplitude). The Reference signal 2 is therefore interpretable by the mobile terminal and its parameters can be modified via the process of self-adaptation according to this embodiment of the invention, until the parameters used to obtain an optimal quality of communication between the payment accessory and the mobile terminal are obtained.

The payment accessory therefore takes this information on reduction of amplitude into consideration to modify the reference signal Reference signal 2 and send out a Reference signal 2bis towards the mobile terminal. The following steps are described here below with reference to FIG. 3*b*.

As illustrated in FIG. 3*b*, it is considered that the payment accessory transmits a reference signal, denoted as Reference signal 2, which the mobile terminal analyses during a first iteration of the analysis step 25. This analysis for example detects an excessively high amplitude of the Reference signal 2 and delivers a first piece of quality information denoted as Quality information 1 consisting of a piece of information on reduction of amplitude.

This first piece of quality information is received by the payment accessory which implements a modification of the reference signal, i.e. in this case a reduction of its amplitude, to transmit a modified reference signal denoted as Reference signal 2bis to the mobile terminal. A second iteration of the step 25 of analysis is then implemented in the mobile terminal, this time detecting an unsuited frequency of the received signal and delivering a second piece of quality information, denoted as Quality information 2, consisting of a piece of information on modification of frequency (for example with a parameter indicating one or more appropriate frequencies).

This second piece of quality information is received by the payment accessory which modifies the reference signal, i.e. in this case it modifies its frequency to transmit a modified reference signal to the terminal, denoted as Reference signal 2ter. A third iteration of the step 25 of analysis is then implemented in the mobile terminal, then leading to the detection of a sufficient quality of this received signal and the delivery of a third piece of quality information, denoted as Quality information 3, which consists therefore of a validation of the quality of the received signal (Reference signal 2ter).

This third piece of quality information is received by the payment accessory which then implements a step of memorization of certain transmission parameters such as for example the amplitude of the reference signal Reference signal 2bis and the frequency of the reference signal Reference signal 2ter as well as possibly other transmission parameters common to the successive reference signal sent out by the payment accessory (for example the shape of the signal: sinusoidal, square or complex format).

This step of memorization can also associate these different parameters with an identifier of the mobile terminal.

Thus, these different transmission parameters will be used subsequently by the payment accessory for the transmission of signals to the mobile terminal so as to optimize the quality of the signals transmitted. For example, the payment accessory transmits data read from a bank card to the mobile terminal, in a signal complying with these memorized parameters, thus enabling the mobile terminal to process these pieces of data optimally, i.e. enabling the terminal to exploit them for the application concerned (for example an application of transaction by bank card).

In the second embodiment illustrated in FIG. 3c, the payment accessory 11 connected to the mobile terminal 12 via the audio channel 13 is deemed to be capable of getting recharged via this channel by a continuous signal transmitted by the mobile terminal.

Indeed, most of the peripherals or payment accessories do not have batteries and the energy for these accessories is provided by a standard audio signal enabling a capacitance to be charged to power the payment accessories for the time needed for example for reading and processing the data of a bank card. Unfortunately, this charge is sometimes insufficient and it is necessary to plan for a battery in the payment accessory to compensate for the lack of charge.

This second embodiment of the invention removes the need for a battery in implementing the self-adaptation method. This is done in order to optimize charging time and the completeness of the charging, as well as to save on the resources of the mobile terminal that gives the charging signal. At the same time, it ensures optimal operation of the payment accessory with the maximum level of charge.

In order to optimize the process of self-adaptation in the context of the charging of the payment accessory, a preliminary total or quasi-total charging-down step is done. Thus, the charging step could be considered to be a reference point that starts from a charged-down payment accessory and is therefore a known state of charge.

Then, the mobile terminal sends out a continuous reference signal to attain a maximum charging level for the payment accessory at the end of a certain period of time. Thus, when the payment accessory has reached this maximum charging level, it transmits a piece of quality information denoted as "quality information" to the mobile terminal. This quality information represents the duration of the charging for example. Depending on this "quality information", the mobile terminal can adjust certain parameters such as the amplitude or frequency of the continuous reference signal so as to optimize the charging duration or the resources of the mobile terminal needed for this charging. Then, these parameters representing an optimal quality of charging of the payment accessory are memorized by the mobile terminal, possibly associated with an identifier of the payment accessory.

According to a third particular embodiment of the invention which is not shown, the steps described here above in the context of the first embodiment are implemented by "inverting" the devices, i.e. in considering the first device to be the mobile terminal and the second device to be the payment accessory. In this case, the self-adaptation optimizes the quality of the signal transmitted from the mobile terminal to the payment accessory.

In addition, these different particular embodiments of the invention can be combined so as to optimize the quality of the signals exchanged in both senses of communication between the two devices as well as the charging of the payment accessory by the mobile terminal.

6.4 Description of Two Examples of Self-Adaptation Devices

Figure 4A:
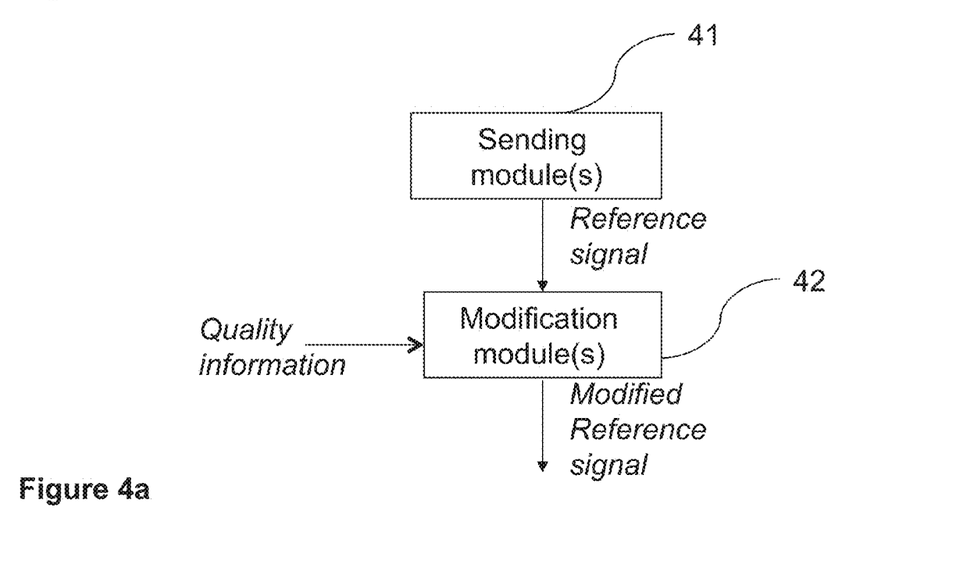
FIGS. 4 and 4b present two examples of devices according to one particular embodiment of the invention.
Figure 4B:
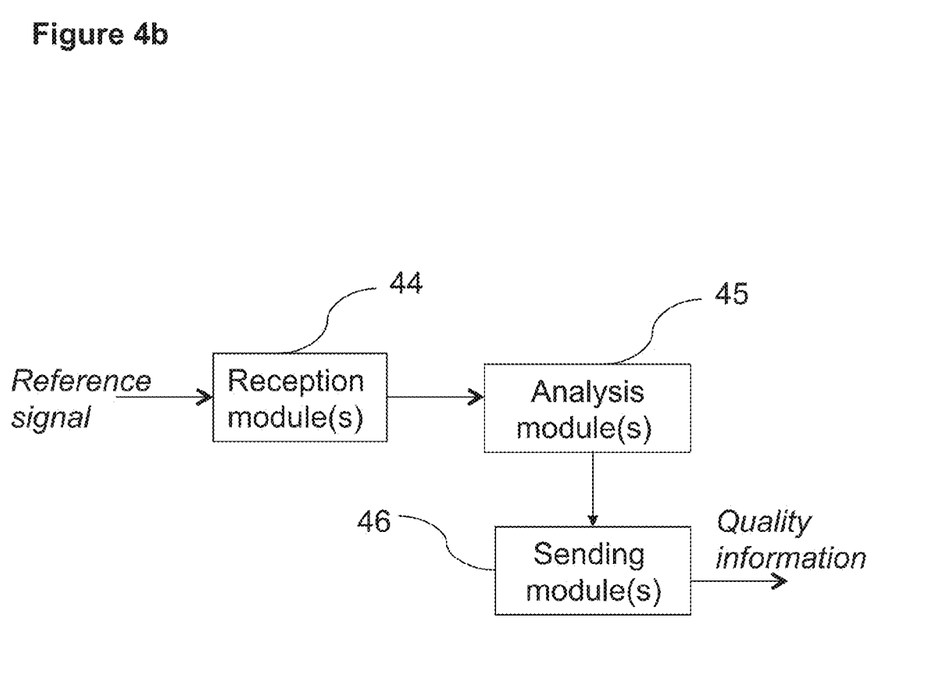

Referring now to FIGS. 4a and 4b, we describe the simplified structures respectively of a first self-adaptation device and second self-adaptation device according to one embodiment of the invention.

This first self-adaptation device comprises means of self-adaptation comprising the following means, for example in the form of modules:
  means/module(s) 41 for sending a reference signal to a distinct electronic device;
  means/module(s) 42 for modifying the reference signal in taking account of at least one piece of quality information present in a response coming from the distinct electronic device, delivering a modified reference signal.

For example, this self-adaptation device is present in the payment accessory of the system illustrated in FIG. 1 and/or in the mobile terminal illustrated in this same FIG. 1.

This self-adaptation device is especially capable of implementing the different steps of the self-adaptation method described here above according to any one of the particular embodiments described here above.

This second self-adaptation device comprises means of self-adaptation comprising the following means, for example in the form of modules:
  means/module(s) 44 for receiving a reference signal ("Reference signal") sent by a distinct electronic device;
  means/module(s) 45 for analyzing the reference signal delivering at least one piece of information representing the quality of the reference signal, denoted as "quality information";
  means/modules 46 for sending the piece of quality information to the distinct electronic device. For example, the self-adaptation device is present in the mobile terminal of the system illustrated in FIG. 1 and/or in the payment accessory illustrated in this same FIG. 1.

This self-adaptation device is especially capable of implementing the different steps of the self-adaptation method described here above according to any one of the particular embodiments described here above.

At least one embodiment of the disclosure provides a technique for optimizing the quality of a signal transmitted via an audio channel between two electronic devices that does not require prior knowledge of the technical characteristics of one and/or the other of the electronic devices.

At least one embodiment of the disclosure provides a technique of this kind that can be used for any standard electronic device on the market.

An embodiment provides a technique of this kind that is simple to implement and costs little.

Although the present disclosure has been described with reference to one or more examples, workers skilled in the art will recognize that changes may be made in form and detail without departing from the scope of the disclosure and/or the appended claims.

The invention claimed is:

1. A method comprising:
   self-adaptation of a quality of non-audio data signal exchanged via an audio channel between a mobile terminal and an electronic payment accessory connected to said mobile terminal via an audio connector of said mobile terminal, wherein self-adaptation comprises:
   sending over the audio channel, by one of said first mobile terminal or said electronic payment accessory, of a first reference signal to the other of said first mobile terminal or said electronic payment accessory, and at least one iteration of the following acts:
   if, before the expiry of a predetermined duration and following the sending of the first reference signal, said mobile terminal or said electronic payment accessory receives a response over the audio channel coming from the other of said first mobile terminal or said electronic payment accessory:
      modification, by said mobile terminal or said electronic payment accessory, of said first reference signal in taking account of at least one piece of quality information present in said response coming from the other of said first mobile terminal or said electronic payment accessory, delivering a first modified reference signal; and
      sending over the audio channel, by said mobile terminal or said electronic payment accessory, said first modified reference signal to the other of said first mobile terminal or said electronic payment accessory;
   when, following the sending of said first reference signal, there is no response over the audio channel coming from the other of said first mobile terminal or said electronic payment accessory at the expiry of the predetermined duration, sending over the audio channel by said mobile terminal or said electronic payment accessory of a second reference signal, distinct from the first reference signal, to the other of said first mobile terminal or said electronic payment accessory without sending again said first reference signal.

2. The method according to claim 1, wherein said quality information belongs to a group consisting of:
   one piece of information on reduction or increase of amplitude of said reference signal;
   one piece of information on modification of frequency of said reference signal;
   a piece of information on modification of the shape of said reference signal;
   one piece of information on modification of the rate of said reference signal;
   one piece of information on validation of said reference signal;
   one piece of information combining at least two of the above-mentioned said pieces of information.

3. The method according to claim 1, further comprising memorizing, in said mobile terminal and/or said electronic payment accessory, at least one transmission parameter of said non-audio data signal when said quality information is a piece of information on validation of the reference signal.

4. The method according to claim 3, wherein said transmission parameter belongs to a group consisting of:
   a value of amplitude of the non-audio data signal;
   a value of frequency of the non-audio data signal;
   a shape of the non-audio data signal;
   a pre-processing of the non-audio data signal;
   a piece of information combining at least two of the above-mentioned values.

5. The method according to claim 3, wherein said act of memorizing also memorizes a parameter of identification of said mobile terminal and/or said electronic payment accessory.

6. The method according to claim 3, further comprising transmission of at least one data signal by said mobile terminal or said electronic payment accessory to the other of said mobile terminal or said electronic payment accessory, the transmission taking account of said at least one transmission parameter memorized during the memorizing act.

7. The method according to claim 6, wherein said quality information corresponds to a piece of information representing a level of charging of said payment accessory.

8. The method according to claim 7, further comprising a preliminary step of charging down said payment accessory.

9. The method of claim 1, wherein all acts of the method are performed by the mobile terminal.

10. The method of claim 1, wherein all acts of the method are performed by the electronic payment accessory.

11. A method comprising:
    self-adaptation of a quality of non-audio data signal exchanged via an audio channel between a mobile terminal and an electronic payment accessory connected to said mobile terminal via an audio connector of said mobile terminal, wherein self-adaptation comprises at least one iteration of the following acts:
    reception over the audio channel, by said electronic payment accessory or said mobile terminal, a first reference signal sent by the other of said electronic payment accessory or said mobile terminal;
    if said electronic payment accessory or said mobile terminal is able to interpret the first reference signal, performing acts comprising:
       analysis of said received reference signal in said electronic payment accessory or said mobile terminal, the analysis delivering at least one piece of information representing quality of the reference signal denoted as quality information; and
       sending over the audio channel said quality information by said electronic payment accessory or said mobile terminal to the other of said electronic payment accessory or said mobile terminal; and
    if, following reception of the first reference signal, said electronic payment accessory or said mobile terminal is not able to interpret the first reference signal, reception over the audio channel, by said electronic payment accessory or said mobile terminal, of a second reference signal, which is distinct from the first reference signal and sent by the other of said electronic payment accessory or said mobile terminal, without receiving again the first reference signal, the first reference signal no being resent by the other of said electronic payment accessory or said mobile terminal.

12. The method according to claim 11 wherein said act of analysis takes account of at least one predetermined criterion representing a desired quality.

13. The method according to claim 12, wherein said predetermined criterion corresponds to a maximum distortion threshold.

14. The method of self-adaptation according to claim 12, wherein said act of analysis comprises the following acts:
processing said reference signal delivering at least one quality parameter of said reference signal;
comparing said quality parameter with said predetermined criterion, delivering said at least one piece of quality information.

15. The method of claim 11, wherein all acts of the method are performed by the mobile terminal.

16. The method of claim 11, wherein all acts of the method are performed by the electronic payment accessory.

17. An apparatus corresponding to a mobile terminal or an electronic payment accessory, the apparatus comprising:
a non-transitory computer-readable medium storing program code instructions; and
a computer configured by the program code instructions to perform acts of a method comprising:
self-adaptation of a quality of non-audio data signal exchanged via an audio channel between the mobile terminal and the electronic payment accessory connected to said mobile terminal via an audio connector of said mobile terminal, wherein self-adaptation comprises the following acts performed by the mobile terminal or the electronic payment accessory:
sending over the audio channel, by one of said first mobile terminal or said electronic payment accessory, of a first reference signal to the other of said first mobile terminal or said electronic payment accessory, and at least one iteration of the following acts:
if, before the expiry of a predetermined duration and following the sending of the first reference signal, said mobile terminal or said electronic payment accessory receives a response over the audio channel coming from the other of said first mobile terminal or said electronic payment accessory:
modification, by said mobile terminal or said electronic payment accessory, of said first reference signal in taking account of at least one piece of quality information present in said response coming from the other of said first mobile terminal or said electronic payment accessory, delivering a first modified reference signal; and
sending over the audio channel, by said mobile terminal or said electronic payment accessory, said first modified reference signal to the other of said first mobile terminal or said electronic payment accessory;
when, following the sending of said first reference signal, there is no response over the audio channel coming from the other of said first mobile terminal or said electronic payment accessory at the expiry of the predetermined duration, sending over the audio channel by said mobile terminal or said electronic payment accessory of a second reference signal, distinct from the first reference signal, to the other of said first mobile terminal or said electronic payment accessory, without sending again said first reference signal.

18. An apparatus corresponding to a mobile terminal or an electronic payment accessory, the apparatus comprising:
a non-transitory computer-readable medium storing program code instructions; and
a computer configured by the program code instructions to perform acts of a method comprising:
self-adaptation of a non-audio data quality signal exchanged via an audio channel between the mobile terminal and the electronic payment accessory connected to said mobile terminal via an audio connector of said mobile terminal, wherein self-adaptation comprises the following acts performed by the mobile terminal or the electronic payment accessory:
reception over the audio channel, by said electronic payment accessory or said mobile terminal, a first reference signal sent by the other of said electronic payment accessory or said mobile terminal;
if said electronic payment accessory or said mobile terminal is able to interpret the first reference signal, performing acts comprising:
analysis of said received reference signal in said electronic payment accessory or said mobile terminal, the analysis delivering at least one piece of information representing quality of the reference signal denoted as quality information; and
sending over the audio channel said quality information by said electronic payment accessory or said mobile terminal to the other of said electronic payment accessory or said mobile terminal; and
if, following reception of the first reference signal, said electronic payment accessory or said mobile terminal is not able to interpret the first reference signal, reception over the audio channel, by said electronic payment accessory or said mobile terminal, of a second reference signal, which is distinct from the first reference signal and sent by the other of said electronic payment accessory or said mobile terminal, without receiving again the first reference signal, the first reference signal no being resent by the other of said electronic payment accessory or said mobile terminal.

19. A non-transitory computer-readable medium comprising program code instructions stored thereon for executing a method of self-adaptation according, when said program code instructions are executed on a computer, wherein the method comprises:
self-adaptation of a quality of non-audio data signal exchanged via an audio channel between a mobile terminal and an electronic payment accessory connected to said mobile terminal via an audio connector of said mobile terminal, wherein self-adaptation comprises:
sending over the audio channel, by one of said first mobile terminal or said electronic payment accessory, of a first reference signal to the other of said first mobile terminal or said electronic payment accessory, and at least one iteration of the following acts:
if, before the expiry of a predetermined duration and following the sending of the first reference signal, said mobile terminal or said electronic payment accessory receives a response over the audio channel coming from the other of said first mobile terminal or said electronic payment accessory:
modification, by said mobile terminal or said electronic payment accessory, of said first reference signal in taking account of at least one piece of quality information present in said response coming from the other of said first mobile terminal or said electronic payment accessory, delivering a first modified reference signal; and
sending over the audio channel, by said mobile terminal or said electronic payment accessory, said first modified reference signal to the other of said first mobile terminal or said electronic payment accessory;
when, following the sending of said first reference signal, there is no response over the audio channel coming from the other of said first mobile terminal or said electronic payment accessory at the expiry of the predetermined duration, sending over the audio channel by said mobile terminal or said electronic payment accessory of a second reference signal, distinct from the first reference signal, to the other of said first mobile terminal or said electronic payment accessory, without sending again said first reference signal.

* * * * *

UNITED STATES PATENT AND TRADEMARK OFFICE
CERTIFICATE OF CORRECTION

PATENT NO. : 9,768,896 B2
APPLICATION NO. : 14/893414
DATED : September 19, 2017
INVENTOR(S) : Christopher Rotsaert Page 1 of 1

It is certified that error appears in the above-identified patent and that said Letters Patent is hereby corrected as shown below:

In the Claims

Column 17, Line 8, Claim 11 delete "no", insert --not--.

Column 18, Line 46, Claim 18 delete "no", insert --not--.

Column 18, Line 51, Claim 19 delete "according".

Signed and Sealed this
Twenty-sixth Day of March, 2019

Andrei Iancu
*Director of the United States Patent and Trademark Office*